United States Patent
Jones

[11] 3,844,743
[45] Oct. 29, 1974

[54] DISPERSED OIL SEPARATOR

[75] Inventor: Loyd W. Jones, Tulsa, Okla.

[73] Assignee: Amoco Production Company, Tulsa, Okla.

[22] Filed: Aug. 9, 1971

[21] Appl. No.: 170,172

[52] U.S. Cl. .................. 55/174, 210/188, 210/307, 210/DIG. 5
[51] Int. Cl. ........................................... B01d 17/04
[58] Field of Search .......................... 55/171–177; 210/23, 30, 39–41, 67, 71, 73, 83, 84, 188, 265, 285–287, 289–293, 307, 320, 484, 502, 539, DIG. 5, DIG. 21; 252/328–330, 439

[56] References Cited
UNITED STATES PATENTS

| | | | |
|---|---|---|---|
| 1,812,629 | 6/1931 | Gifford | 252/330 |
| 2,102,796 | 12/1937 | Happel et al. | 252/439 X |
| 2,385,527 | 9/1945 | Mehefee et al. | 210/28 X |
| 2,959,289 | 11/1960 | Figert et al. | 210/23 X |
| 3,417,015 | 12/1968 | Canevari et al. | 210/307 X |
| 3,558,482 | 1/1971 | DeYoung | 210/23 |

FOREIGN PATENTS OR APPLICATIONS

| 3,036 | 2/1900 | Great Britain | 210/40 |
|---|---|---|---|

*Primary Examiner*—Thomas G. Wyse
*Attorney, Agent, or Firm*—John D. Gassett; Paul F. Hawley

[57] ABSTRACT

This invention relates to water pollution control and concerns a system for removing dispersed oil from water by contacting the oily water with sulfur to cause the oil to coalesce or agglomerate. This invention concerns a horizontal vessel containing a sulfur media through which the oily water flows. The sulfur media presents an area of solid phase sulfur to coalesce the dispersed oil.

8 Claims, 3 Drawing Figures

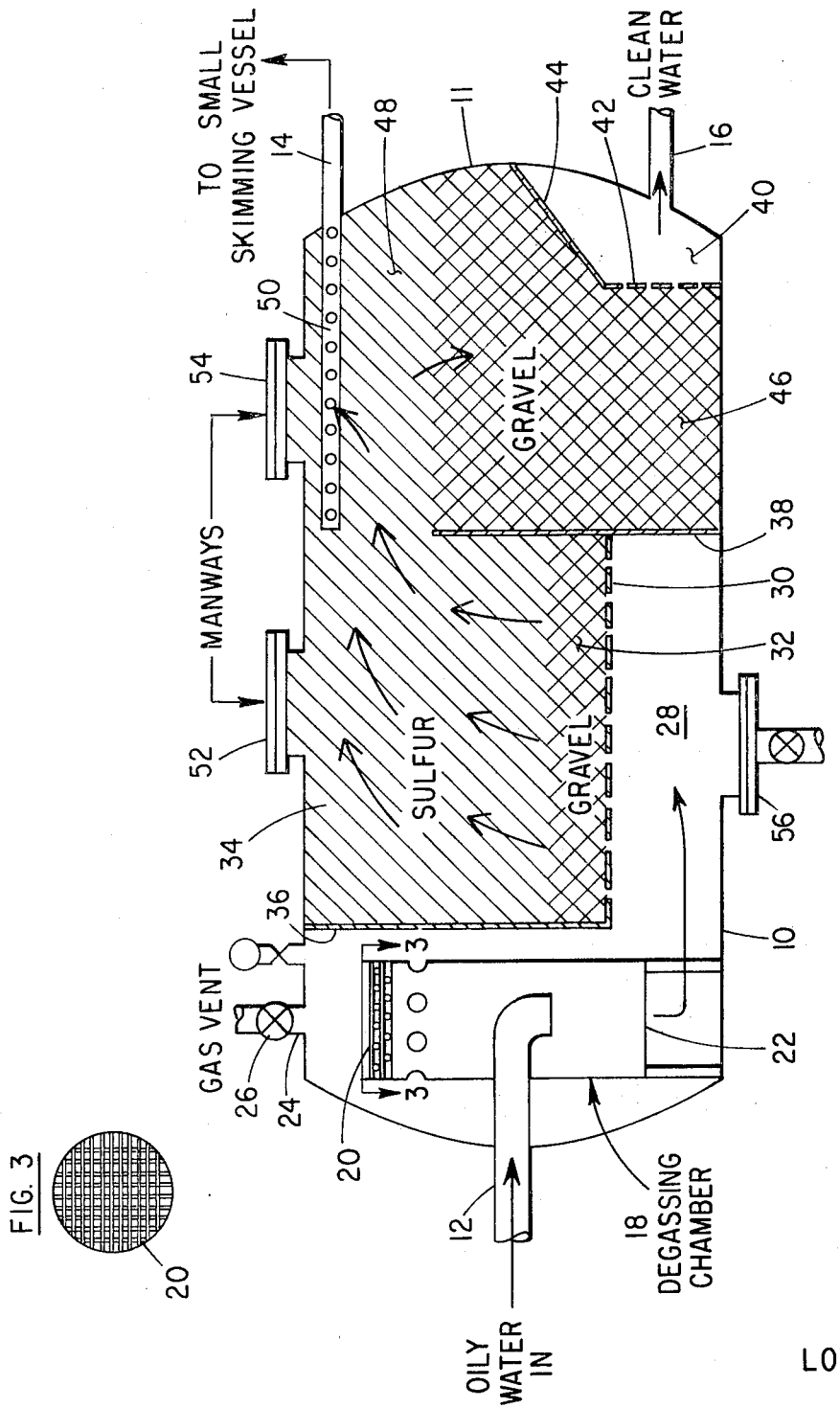

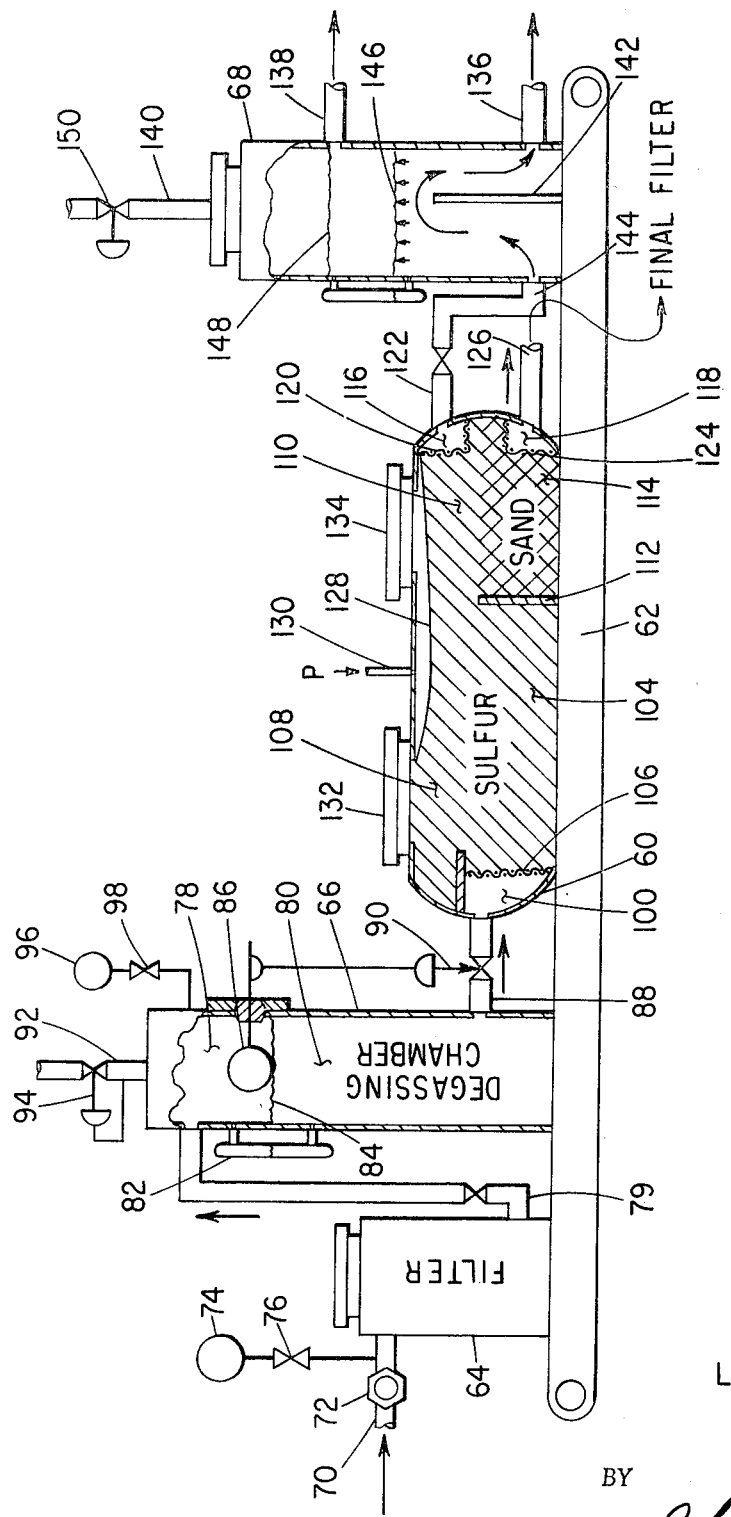

DISPERSED OIL SEPARATOR

CROSS REFERENCE TO RELATED APPLICATION

This application is closely related to U.S. Pat. application 80,424, entitled "Removing Oil from Waste Water with Sulfur" filed Oct. 13, 1970. The inventor in that application is Loyd W. Jones, who is also the inventor of this present application.

BACKGROUND OF THE INVENTION

1. Field of the Invention

This invention relates to a method of removing dispersed oil from oily water by contacting the oily water with sulfur particles to cause the oil to coalesce or agglomerate. It partly concerns the method or system in which the water containing the dispersed oil is flowed horizontally through a vessel containing a bed of granular solid phase, yellow sulfur to coalesce the dispersed oil.

2. Setting of the Invention

In recent years the government and public have become increasingly aware of the need to eliminate pollution of our atmosphere and our water. Industry is moving to minimize these pollution problems both due to a sense of public obligations and to meet legal requirements. Although many of our larger industrial sites are experiencing air pollution problems, it is believed that as a nation the elimination of the pollution from our water systems is more urgent.

Many water pollution problems are recognized but the solution is not always readily apparent. A particularly troublesome area is the pollution of water by floating and dispersed oil. This problem is nearly always present around oil refineries and oil producing transportation facilities. Of course, there are known ways of removing essentially all oil from such oily water. However, such known means are either rather expensive or not adaptable to large scale operations.

Many of the oil field waters contain up to about 100 to 500 ppm of oil. This should be reduced to approximately 10 ppm or less if the water is to be dumped into surface streams. If this water is to be injected into an underground river to aid in driving out the oil, as is common in secondary recover operations, the oil content should be less than 10 ppm. The invention described herein teaches an economical way of removing the dispersed oil from water and is a big help in reducing this phase of water pollution.

BRIEF SUMMARY OF THE INVENTION

This concerns a method of removing dispersed oil from water by contacting the oily water with sulfur to cause the oil to coalesce or agglomerate. In a preferred embodiment the sulfur media is contained in a horizontal vessel. Oily water enters one end of the vessel and passes through the sulfur media. A barrier extending from the bottom of the vessel part way up through the sulfur media causes the flow of liquid to all be directed to the top of the opposite or outlet end of the vessel. The dispersed oil stays at the top portion of the outlet end of the vessel where it is removed. The water falls by gravity separation downstream of the barrier where it is removed from the output end of the vessel. Both coalescence of the oil droplets and separation of the oil from the bulk of the water is thus accomplished in a single vessel.

BRIEF DESCRIPTION OF THE DRAWINGS

A better understanding of the invention and various modifications, and objects thereof can be made with the following description taken in conjunction with the drawings.

FIG. 1 is a view, partly in section, of the horizontal separator of the invention.

FIG. 2 is partly in section and partly schematic and shows a modification of the horizontal filter together with auxiliary filtering and degassing facilities.

FIG. 3 illustrates a view along the line 3—3 of FIG. 1.

DETAILED DESCRIPTION OF THE INVENTION

The use of a continuous flow packed column is attractive as a simple means of concentrating dispersed oil so that it can be readily removed from the water. FIG. 1 illustrates one coalescing system for removing dispersed oil from water. Shown in FIG. 1 is a horizontal cylindrical vessel 10 which has an oily water inlet 12 at the inlet end and the outlet end of the vessel has an oil outlet 14 at the top portion and a water outlet 16 at the lower end. The oily water flows from inlet 12 into a degassing chamber 18 which can be merely a vertical cylindrical vessel having a grid 20 at the top for escape of gas and an open end 22 at the lower end for the flow of water. A gas vent 24 with control valve 26 is provided in the upper side of vessel 10, preferably directly above grid 20.

The water flows from degassing chamber 18 to a water distribution chamber 28 in the lower part of vessel 10. Immediately above chamber 28 is a perforated plate 30 which supports a gravel bed 32. Immediately above gravel bed 32 is a sulfur bed 34. As I taught in my said U.S. Pat. application 80,424, I have discovered that the surface of sulfur is highly efficient as an oil collector. The surface of yellow sulfur is many times, at least three, more efficient in this respect than other forms of sulfur such as white sulfur, for example. Yellow sulfur is also many times, at least three, more efficient than other substances such as carbon and straw. The oil-sulfur contact angle of yellow sulfur is apparently very low for most unrefined oils and the adhesive force strong. Visual observations indicate that an oil film or sulfur can increase to a surprising thickness in the presence of flowing oily water such as water containing as little oil as 1 ppm. In contact with sulfur, the oil film appears to be abnormally cohesive. While I do not know for sure, it is believed that traces of sulfur are dissolved into the oil and induces increased oil-to-oil cohesiveness; possibly by reduced repulsive polar forces at unsaturated bonds in the hydrocarbon molecules. Because of this finding, I construct bed 34 to have a surface area of solid phase yellow sulfur to coalesce the dispersed oil. The purpose of the plate 30 and gravel bed 32 is merely to support the sulfur bed 32 and to provide for distribution of the oily water. A first plate 36 encloses the end of the sulfur bed 34 from the inlet side or end of vessel 10. This causes all the water to flow through distributing chamber 28.

A vertical baffle 38 is provided toward the outlet end 11 of chamber 28. This baffle 38 extends, for example about half-way up through the sulfur bed. A clean water chamber 40 formed by the vessel 10 and perforated vertical wall 42 and sloping wall 44 is provided adjacent clean water outlet 16. A gravel bed 46 is provided between vertical baffle 38 and clean water chamber 40. Sulfur bed 34 has an auxiliary portion 48 which extends over gravel bed 46. A perforated conduit 50 for collecting coalesced oil extends from oil outlet 14 into this portion 48 of the sulfur media.

Manholes 52, 54 and 56 are provided for access to the interior of vessel 10.

A few comments to be made concerning the operation of the device described above for FIG. 1: Oily water is pumped into inlet 12 under pressure. If there is gas contained in the water it is separated out by degassing chamber 18 and removed through gas vent 24. The degassed water flows into distribution chamber 28 and upwardly through gravel bed 32. The oily water then flows up through sulfur bed 34 where the sulfur surface contacts the dispersed oil droplets and causes them to coalesce. By the time the flow of fluids reaches the auxiliary portion 48 of the sulfur media the fine drops of oil have all been coalesced. It is here that the separation of the oil and water occurs by gravity. The water flows downwardly through gravel bed 36 and out through clean water outlet 16. The oil coalesces at the top of auxiliary bed 48 and is removed through oil outlet 14. It is contemplated that in the maximum efficient operation of this device that there will be some water withdrawn with the oil through outlet 14. However, as the oil at this stage has been coalesced, the oil can be readily removed from the water in a small skimming vessel exterior the vessel 10.

The most efficient rate of the flow of oily water through the sulfur media of this invention can be easily determined. It may, of course, vary depending upon the quantity of oil in the water and how finely it is dispersed. For any flow rate, one should determine the oil content, if any, of the water flowing through clean water outlet 46. This can be done by known laboratory techniques. If the oil has all been removed or removed to an acceptable minimum level, taking in account the intended use of the clean water, one is assured that the operation of the system is satisfactory. It is contemplated that typically the flow rate will be in the order of about 10 gallons per minute per square foot of sulfur bed 34 taken through a horizontal plane at the gravel interface.

Attention is now directed to FIG. 2 which illustrates a modified coalescing vessel 60 mounted on a frame or skid 62. This unit also shows a pre-filter 64, a degassing chamber 66 and an oil skimming 68, all connected together to form a complete filter and coalescing unit. Filter 64 is provided with inlet 70 having valve 72 and a pressure gage 74 with valve 76. Filter 64 is a pre-filter which merely filters out coarse materials such as clumps of solids and waxy matter that could clog the sulfur bed, but does not attempt to filter the finely dispersed oil or fine solids less than about 25–50 microns in size.

Filter 64 has an outlet 78 which is connected to the upper end of degassing chamber 66. Gas collects in an upper portion 78 and water in a lower portion 80 of degassing chamber 66. Sightglass 82 is provided so that the interface 84 between the liquid and gas in chamber 66 can be observed. A float 86 follows the level of interface 84. Degassing chamber 66 has an outlet 88 which has a motor valve 90. This valve 90 is controlled by float 86 so as to maintain interface 84 at a selected position. Gas from degassing chamber 66 is evacuated through outlet 92. Outlet 92 has a back pressure control valve 94. Gas chamber 78 is also provided with a pressure gage 96 having valve 98.

The sulfur coalescing vessel 60 is horizontal, similar to that of FIG. 1. However, it has a different arrangement of baffles and water distribution means. Vessel 60 has an inlet distribution chamber 100 which is in communication with water outlet 88 of the degassing chamber. A horizontal baffle plate 102 forms the upper side of distribution chamber 100. The distribution chamber 100 is separated from sulfur media 104 by a perforated vertical distribution plate 106. Sulfur bed 104 has a first or main portion 108 which extends the complete vertical distance of vessel 60. Sulfur bed 104 has an auxiliary portion 110 which as shown fills about the upper half of the vessel 60 downstream of vertical baffle 112. Immediately below auxiliary portion 110 is a sand or gravel pack 114.

Vessel 60 contains an oil accumulating outlet chamber 116 and a clean water accumulating chamber 118. Oil accumulating chamber 116 is formed in auxiliary sulfur media bed 110 by perforated plates or screen 120. It is connected to oil outlet conduit 122. Water collecting chamber 118 is formed in sand bed 114 by perforated plates or screen 124. Chamber 118 is connected to water outlet conduit 126. Water outlet 126 can be connected to a final filter not shown in the drawing for use in event the water contains solid particles which should be removed before the water is reused or dispersed into a public stream.

A flexible diaphragm 128 is placed along the top of the vessel 60 and means are provided for applying fluid pressure through conduit 130 to the top of membrane or diaphragm 128. By applying pressure to membrane 128 the sulfur media can be maintained in vertical compression. Manholes 132 and 134 are indicated so that access can be had to interior of vessel 60.

It is anticipated that for maximum efficiency of operation there will be a little water removed with the oil through outlet 122. I therefore provide an oil skimming tank 68. This can be a simple vertical vessel having a water outlet 136 near the bottom, an oil outlet 138 which is toward the top of vessel 68 and a gas outlet 140 on the top. It should be noted that if degassing chamber 66 is functioning properly there will be very little, if any, gas accumulate in oil skimmer 68. Shown in vessel 68 is a vertical plate 142 which is between the oil and water inlet 144 and the water outlet 136. The vessel 68 is sized so that the resident time of the oil and water pouring therethrough is sufficient for the oil and water to separate by gravity. It will be noted that now all of the real fine droplets of oil which were in the input water have been coalesced by contact with sulfur bed 104 into large droplets so that the oil and water is now easily separated by simple skimming procedures. This procedure results in a water oil interface 146 and a gas oil interface 148. Gas outlet 140 has a control valve 150 which is controlled similarly as is valve 94 of gas outlet 92 from the degassing chamber 66.

It is considered that the operation of the device of FIG. 2 is now self-evident when compared with the explanation given in regard to the operation of FIG. 1.

It can be seen from the foregoing description of the two exemplary vessel designs and their mode of operation that this invention has certain inherent and common features. Regardless of the mechanical details, the water containing dispersed oil is caused to flow first through a packed bed presenting a very large total area of solid phase yellow sulfur to the continuously flowing water. The bed is arranged in such a way that as the oil is coalesced it moves into the upper portion of the bed where it is concentrated. Both the affinity of the oil for the preferentially oil wettable sulfur and the difference in density between the oil and water causes the oil to stay in the upper portion of the bed. Conversely, the water does not wet the sulfur and is heavier than the oil. Consequently the water settles in a downward direction. By this means separation of oil and water occurs within the packed bed. In other words the flow paths of the oil and water phases are automatically separated before either phase leaves the packed bed. This is the advantage of having the bed oriented horizontally as opposed to vertically. With a vertically oriented bed, and fluid flow in either an upward or downward direction, the coalesced oil phase and the water must exit the bed before their flow paths are reversed and separation occurs. In such a situation the emerging oil globules tend to cling to the oil wettable coalescing medium and are distorted into filaments or stringers which can break up into small droplets. With the horizontal bed arrangement, the oil, being the wetting phase, moves continuously along the walls of the interstices of the sulfur bed medium and ultimately accumlates into a continuous flowing phase that fills substantially all the interstices of the upper portion of the bed. The non-wetting water phase migrates by gravity to the lower portion of the bed and exits cleanly without clinging to the medium.

The just described flow patterns of the two phases, induced by wetting and gravity forces, can be disturbed if the flow rate through the bed becomes excessive. Consequently, the flow rate through the most constricted vertical cross-sectional plane in the horizontal vessel should generally not exceed about 20 gallons per minute per square foot. As mentioned above the best flow rates can be determined by experimental use.

While the above invention has been described in considerable detail it is possible to make many modifications thereof without departing from the spirit or the scope of the invention. For example I can use a horizontal vessel having a uniform section of sulfur therethrough and a water collecting chamber, such as sand 114 and chamber 118, merely attached beneath the sulfur bed at the output end.

I claim:

1. An apparatus for removing finely dispersed oil from oily water which comprises:
   a horizontal vessel having an inlet end and an outlet end;
   an oily water intake at the inlet end of said vessel;
   an oil outlet in the outlet end of said vessel near the top thereof;
   a water outlet in the outlet end of said vessel near the lower part thereof;
   a bed of elemental sulfur particles in said vessel in the flow path between said oily water inlet and said oil outlet and water outlet.

2. An apparatus as defined in claim 1 including a skimming vessel connected to said oil outlet.

3. An apparatus as defined in claim 1 including water collecting means connected to said water outlet and positioned below at least a part of said sulfur bed.

4. An apparatus as defined in claim 1 including means to maintain a vertical compressive force on said sulfur bed.

5. An apparatus as defined in claim 1 including:
   a first vertical baffle near the said oily water inlet and extending from the top of said vessel to a level above the bottom of said vessel;
   a second vertical baffle positioned between said first baffle and the outlet end of said vessel, said second vertical baffle extending from the bottom of said vessel to a level lower than the top of said vessel;
   a horizontal perforated plate in said vessel extending from the lower end of said first plate to an intermediate position on said second vertical plate;
   said sulfur bed filling at least a part of the space between said first vertical baffle and said second baffle below the top of said second vertical baffle.

6. An apparatus as defined in claim 5 including degassing means within said vessel between the inlet end of said vessel and said first vertical baffle and including means for removing the gas from said degassing means.

7. An apparatus as defined in claim 5 including a bed of non-sulfur particles in said vessel between said second vertical baffle and the outlet end of said vessel.

8. An apparatus as defined in claim 5 including an oil collecting conduit means within said vessel in fluid communication with the oil outlet of said vessel and the upper portion of said sulfur bed.

* * * * *